United States Patent [11] 3,553,353

[72] Inventor Gerard Melchior
Asnieres, France
[21] Appl. No. 609,140
[22] Filed Jan. 13, 1967
[45] Patented Jan. 5, 1971
[73] Assignee Compagnie Francaise De Television
a corporation of France
[32] Priority Jan. 21, 1966
[33] France
[31] No. 46777

[54] RECEIVER FOR PAL COLOR TELEVISION SYSTEM

2 Claims, 3 Drawing Figs.

[52] U.S. Cl. 178/5.4
[51] Int. Cl. H04n 9/40
[50] Field of Search 178/5.2, 5.4, 5.4(3)

[56] References Cited

UNITED STATES PATENTS

| | | | |
|---|---|---|---|
| 2,793,348 | 5/1957 | Hunter | 178/5.4 |
| 2,993,086 | 7/1961 | De France | 178/5.4(3) |
| 3,162,838 | 12/1964 | Sauvanet | 178/5.2 |

FOREIGN PATENTS

| | | | |
|---|---|---|---|
| 1,185,649 | 1/1965 | Germany | 178/5.4 |

*Primary Examiner*—Robert L. Griffin
*Assistant Examiner*—R. P. Lange
*Attorney*—Kurt Kelman

ABSTRACT: Phase errors in a PAL color television receiver are eliminated. The color signals are derived from the sum and difference of two terms, the first being the modulated subcarrier, delayed by a period substantially equal to the duration of a line while the other term represents a signal obtained by mixing the nondelayed subcarrier with the subcarrier delayed by a period substantially twice as long as the duration of a line.

PATENTED JAN 5 1971 3,553,353

INVENTOR:
GÉRARD MELCHIOR
BY Kurt Kelman
AGENT

RECEIVER FOR PAL COLOR TELEVISION SYSTEM

The present invention relates to circuits for demodulating the subcarrier in color television systems, and to the associated transmitters or receivers, said systems being of the kind in which the composite video signal comprises, in addition to a luminance signal, a subcarrier which is c used for the transmission of two color signals $$D_1=D\cos\varphi \text{ and } D_2=D\sin\varphi$$

said subcarrier being amplitude-modulated as a function of $D=\sqrt{D_1^2+D_2^2}$ and phase-modulated as a function of Φ

More particularly, the subcarrier S (*t*) in the systems considered here, has at the time *t a* phase P (*t*) such that, T being a time equal or at least very nearly equal to one line period, the difference P (*t*) − P (*t*− T), is a function of Φ (*t*), and/or of Φ (*t* − T), the phase-modulation of the subcarrier being moreover such that if (*t*) is considered as equal to Φ, Φ (*t* − 2T), then P (*t* − 2T) − P (*t* − T) can be considered as equal to P(*t*) − P(*t* − T) which will be written P(*t*) = P(*t* − 2T).

In systems of this kinds kind, the subcarrier alternately has two different forms, this alternation taking place at the line frequency.

The above mentioned conditions are satisfied in the P A L system in which a subcarrier S (*t*) is transmitted, having alternately the forms $$S'(t)=D(t)\sin[wt+\varphi(t)]$$
$$S''(t)=D(t)\sin[wt-\varphi(t)]$$

where *w* is a constant angular frequency in radians and T such, that *w*T is substantially a multiple of 2 π.

In this system, at the receiving end, the sum $S_s$ and the difference $S_d$ are formed from the subcarrier being transmitted and from the subcarrier delayed by T. Since according to a permissible approximation D (*t* − T) and Φ (*t*–*t*) are considered as respectively equal to D(*t*) and Φ (*t*), this gives $$S_s=D\cos\varphi\sin wt=2D_1\sin wt$$
$$S_d=\pm D\sin\varphi\cos wt=\pm 2D_2\cos wt$$

the sign (+ or − ) depending upon the form (S′ or *s*″) of the subcarrier being transmitted.

The signals $D_1$ and $D_2$ are obtained in two synchronous demodulators which respectively receive on the one hand the signal $S_s$ and an auxiliary sinusoidal signal sin *wt*, and on the other hand the signal $s_d$ and an auxiliary sinusoidal signal cos *wt*, which auxiliary signals may be obtained in various ways, in particular by means of a reference signal of phase $wt+\beta$ where β is constant, during the horizontal blanking intervals.

These same conditions are satisfied if the phase P(*t*) of the subcarrier alternates between the forms $$P'(t)=wt+\varphi(t)$$
$$P''(t)=wt$$

*w* having the same significance as before, and the amplitude of the subcarrier being for example D (*t*)

In this case, signals $D_1$ and $D_2$ can be obtained in two synchronous demodulators, one of which is fed with the subcarrier being transmitted and with the subcarrier delayed by T and brought to a constant amplitude, and the other of which receives the same waves, but for a + or − π/2 phase-shift alternatively imparted to the delayed subcarrier.

These examples are of course in no way limitative of the scope of the invention.

Systems of this kind are hereinafter referred to as "systems of the described type."

It will be remembered on the other hand that, if $D_1$ and $D_2$ are two chrominance signals, as far as chromaticity is concerned the magnitude D is a saturation information whilst the value Φ determines the hue, and that the exact reproduction of Φ is much more important than the exact reproduction of D, due to the fact that the human eye is much more sensitive to errors of hue, than to saturation errors.

In receivers used in systems of the described type it is therefore necessary to have two simultaneous signals at subcarrier frequency, with respectively the phases P (*t*) and P (*t* − T).

Any additional phase shift or amplitude variation which may be imparted to the subcarrier for various ends will be disregarded here. It will simply be remarked that such phase-shifts are kept constant within each active line duration.

The case where the two signals referred to are the subcarrier S (*t*) and this same subcarrier delayed by a time T, i.e. S (*t*–T) will be considered here.

By active line duration is meant any interval of time elapsing between two successive horizontal blanking intervals, and used for the transmission of signals related to the picture content.

The signal of phase P (*t* − T)is obtained using a delay device which is generally an ultrasonic delay line.

A delay line of this kind comprises a first transducer which transforms the electrical signals into ultrasonic signals, an ultrasonic channel which delays the ultrasonic signals, an ultrasonic channel and a second transducer which transforms the delayed ultrasonic signals back into electrical signals.

The precise amount of delay T is determined by transmission standards. In practice, if the delay T′ imparted by the delay device differs slightly from its nominal value T, the resultant phase error produced in the delayed signal can be adequately corrected using a phase-shifting network.

This, however, is adequate only if the value T′ is constant in other words it does not allow any compensation for any instability of the delay device due in particular to the influence of temperature variations on the ultrasonic channel.

On the other hand, the demodulating device which uses the phase difference.

$$P(t)-P(t-T)$$

does not operate correctly even with a perfectly stable delay device, if the aforesaid phase difference is affected by an error due to the instability of the subcarrier frequency.

Instability of this kind may, for example, be due directly to the oscillator generating the subcarrier in the transmitter transmitting the composite video signal of which the subcarrier is a part; or, if the composite video signal is obtained from a magnetic storage device, such an error may be produced by an instability of the tape speed.

Of course, the phase shift due to a delay, is a function of the frequency.

The present invention allows correction of phase errors due to such instabilities.

According to the invention, the phase errors due to instabilities in a PAL receiver are eliminated by deriving the sequential color signals $D_1$ and $D_2$ from the sum and the difference of two terms, one of which is the modulated subcarrier delayed by a period T substantially equal to the duration of a line, and the other term is a signal obtained by mixing the non-delayed subcarrier with the subcarrier delayed by a period 2T substantially twice as long as the duration of a line.

The invention will be better understood, and other features will become apparent, from the following more detailed description and accompanying drawings, wherein.

Figure 1:
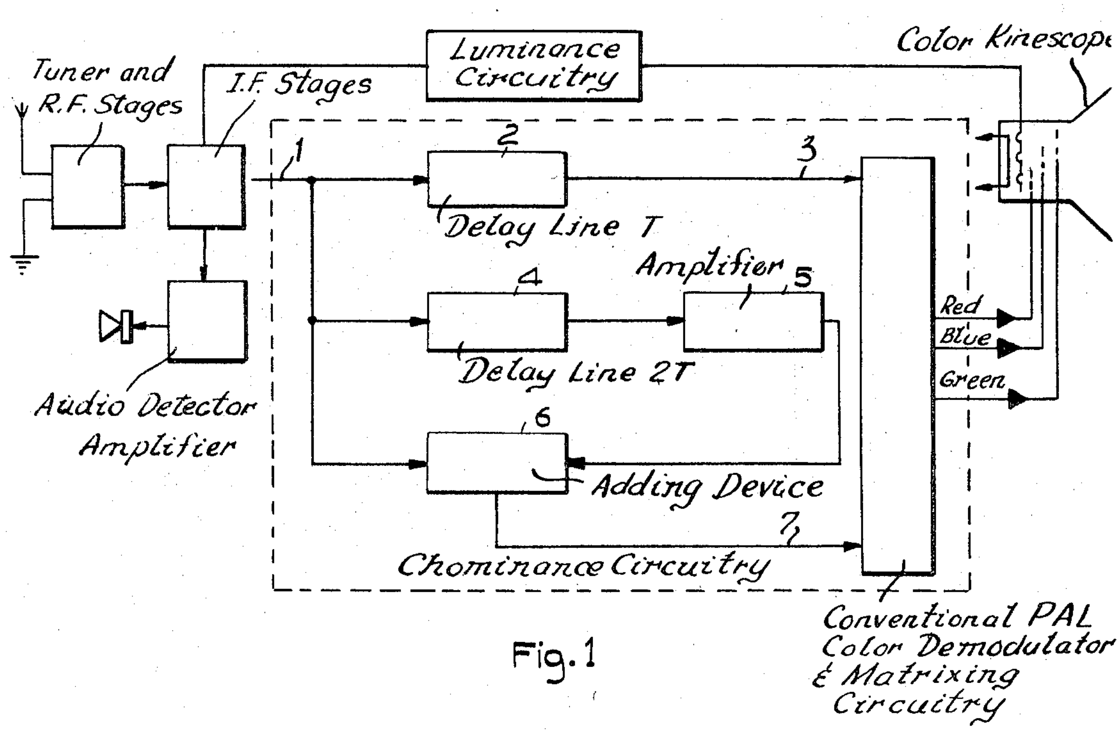
FIG. 1 is the diagram of a PAL television receiver including an illustrative embodiment of a color subcarrier demodulating circuit according to the invention.

In the circuit of FIG. 1, there are formed on the one hand a subcarrier of nominal phase P (*t*–T) and on the other hand a subcarrier whose nominal phase is $\frac{P(t)+P(t-2t)}{2}$.

In FIG. 1, the subcarrier S (*t* ), having a phase P ((*t*) = *wt* + θ (*t*) is applied to input 1.

In the PAL system, θ (i t) alternates between Φ (*t* ) and − Φ (*t*).

In accordance with the second phase law set out above, $\theta$ ( ($t$) alternate between $\Phi$ ($t$) and 0.

The amplitude of the subcarrier is D ($t$) for example.

The input 1 feeds in parallel a delay line 2, imparting a nominal delay T, a delay line 4, imparting a nominal delay 2T, and the first input of an adding device 6, the latter preferably being set to deliver the half sum of the two signals applied to its inputs.

The delay lines 2 and 4 are of identical type, with the exception of the length of the ultrasonic channels, such that an algebraic error $\Delta T$, arising from a variation in temperature and occurring in the delay produced by the first ultrasonic channel, will normally be associated with an error 2 $\Delta T$ in the delay imparted by the second ultrasonic channel. The invention will be explained on the basis of the assumption that there are no other instability factors affecting the delay devices, i.e. none other than those from which an error proportional to the nominal delay arises.

The delay line 4 is followed by an amplifier 5, the output of which is connected to the second input of the adding device 6.

The delay line 2 supplies a signal of phase P($t$–T–T), which can, if necessary, be subsequently amplified, in order to bring it to the level D ($t$). Then:

$$P(t-T-\Delta T)=wt-w\Delta T+\theta(t-T-\Delta T)/wt$$

If $\theta$ ($t$) is zero, the error due to its substitution by $\theta$ ($t$ – T – $\Delta$T) is zero.

If $\theta$ ($t$) is equal to $\pm\Phi$ ($t$), the corresponding error can be considered as negligible. The same does not apply, however, to the error $w^{**}\Delta T$, which can quite easily be in the order of several tens of degrees, whilst the permissible tolerance is no more than $\pm$ 10°.

The amplifier 5 is adjusted so that its gain compensates for the attenuation caused by the delay line 4.

Its output is therefore S ($t$–2T–2$\Delta$T) = D ($t$ – 2T – 2$\Delta$T) sin[$wt$ $w$T – 2$w$. $\Delta$T + $\theta$ ($t$ – 2T – 2$\Delta$T).]

Since D and $\theta$ (where $\theta$ is not constant) are picture information, it is, in their case, possible to neglect the time difference 2$\Delta$T. Setting $w^{**}\Delta T=\alpha$, there is obtained, at the output 3 of the line 2, taking into account the permissible approximations which have been made, a signal whose phase is $$wt+\theta(t-T)-\alpha wT$$

and at the two inputs of the adding device 4, the signals $$D(t)\ \sin\ [wt+\theta(t)]$$

and D ($t$ – 2T) sin [$wt$ 2$w$T + $\theta$ ($t$ – 2T) – 2$\alpha$]

If D ($t$) and D ($t$ – 2T) are only slightly different from one another, this being usually the case, and also being in fact the case in the particularly critical zones which correspond to the areas of uniform color, the adding device 6 will deliver at its output 7 a signal having the phase $$\frac{wtwT+\theta(t)+\theta(t-2T)-\alpha}{2}$$

and an amplitude substantially equivalent to $$\frac{D(t)+D(t-2T)\ \cos\ \alpha}{2}$$

which can be written as $\frac{D(t)+D(t-2T)}{2}$ as long as $\alpha$ remains small.

The tolerance on D ($t$)is thus very wide if $D_1$ and $D_2$ are two chrominance signals, which is generally the case.

Anyway, the error in D ($t$) is of no importance as long as the amplitude of this signal is not used to recover video frequency signals, the information D ($t$) being then supplied by the output signal from the delay line 2, after suitable amplification.

It will be seen therefore that at the outputs 7 and 3 two signals are obtained, the phase shift between them being substantially $$\frac{\theta(t)+\theta(t-2T)}{2}-\theta(t-T),$$

which may be written $$\frac{P(t)+P(t-2T)}{2}-P(t-T)=\frac{P(t)-P(t-T)}{2}$$

$$+P\frac{(t-2T)-P(t-T)}{2}\simeq P(t)-P(t-T),\text{ this}$$

in accordance with the basic assumption, whereas in the case of the subcarrier S ($t$) and the subcarrier S ($t$–T), the latter suitably delayed by the nominal value T, two signals would have been obtained, whose phase difference P ($t$) – P ($t$–T–$\Delta$T) includes the term $w\Delta T$ that can be high enough to cause serious errors in the colors.

The signals available at outputs 7 and 3 can subsequently be handled in the demodulating circuit in the same manner as S ($t$) and S ($t$ – T) would have been in a conventional demodulating circuit.

The approximation made by equating the term to of is generally substantially less important than the phase shifts which may result from instability in a delay line. More important than this, as will be shown hereinafter, the circuit in accordance with the invention, when combined with a delay in the luminance signal with which the subcarrier is associated, produces a clear improvement in the vertical definition of the signal $\Phi$ in relation to conventional demodulating circuits.

Finally, the use of the mean value $\frac{P(t)+P(t-2T)}{2},$ as results from known theoretical considerations, brings an improvement to the signal-to-noise ratio.

Assuming, for simplicity's sake, that the two delay devices produce effective delay T and 2T equal to the nominal delays, let now be considered a drift of the angular frequency of the subcarrier, this angular frequency becoming $w+\Delta w$.

In those circumstances, the delay device 2 delivers a signal whose phase is $$P(t-T)-T\cdot\Delta w$$

the delay device 4 delivers a signal whose phase is $$P(t-2T)-2T\cdot\Delta w;$$

and the adding device 6 delivers a signal the phase of which is substantially $$\frac{P(t-2T)+P(t)}{2}-T\cdot\Delta w$$

Here, again, the error term $T^{**}\Delta w$ disappears when taking the phase difference between the signals obtained at the outputs 7 and 3 respectively.

Figure 2:
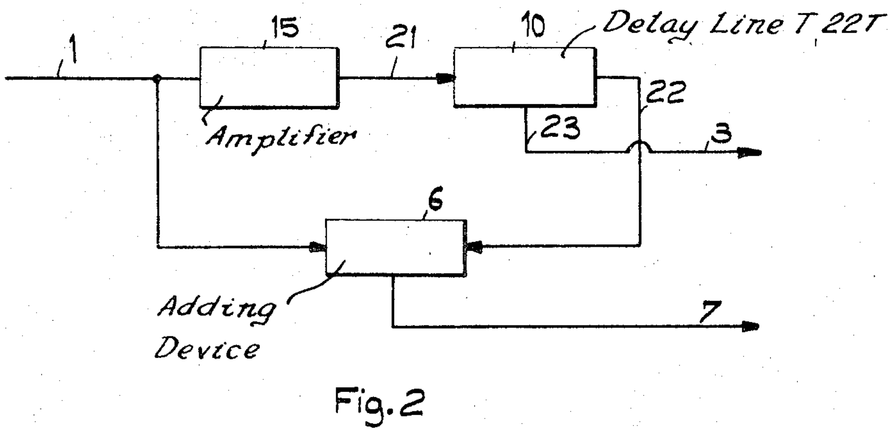
FIG. 2 is a diagram of an alternative embodiment of the color subcarrier demodulating circuit illustrated in FIG. 1.

FIG. 2 illustrates a modification of the circuit of FIG. 1, in which the delay lines 2 and 4 are substituted by a single delay device 10, with two outputs, delivering two signals delayed respectively by T and 2T (nominal values) at the outputs 23 and 22.

The input 1, the outputs 3 and 7, and the adding device 6 are, as described in relation to the preceding embodiment.

The input 1 feeds in parallel the first input of the adding device 6 and, through an amplifier 15, the input 21 of the delay device 10, the output 22 of which is coupled to the second input of the adding device, its output 23 being connected to the output 3 of the circuit.

The amplifier 15 is so adjusted that its gain compensates for the attenuation, imparted by the delay device 10; in the signals supplied at its output 22. This arrangement of the amplifier 15 before the delay device 10 means that advantage is taken of the amplification for the signals delivered at the output 23 of the delay device 10. Apart from this, operation is the same as in circuit of FIG. 1.

Figure 3:
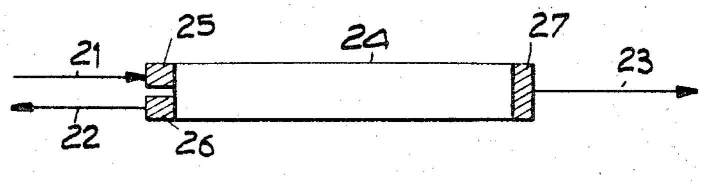
FIG. 3 depicts an illustrative delay device which may advantageously employed with the color subcarrier demodulating circuit shown in FIG. 2.

FIG. 3 illustrates in a highly schematic way, an embodiment of the delay device 10.

It comprises: an ultrasonic channel 24, of steel or glass for example, an input transducer 25, the input of which is the input 21 of the device 10, and which is connected to one of the ends of the ultrasonic channel 24 over approximately half the area of this end; a first output transducer 27 connected to the second end of the channel 24, the output of the transducer 27 being the output 23 of the device 10, and a second output transducer 26 connected to the first end of the channel 24, over approximately half the area thereof, the output of the transducer 26 being the output 22 of the device 10.

The signals applied at 21 are converted into ultrasonic signals by the transducer 25, these signals passing through the channel 24 and being in part reflected towards the first end of the rod where the transducer 26 converts them back to electrical signals while the other fraction is applied to the transducer 27 and converted thereby into electrical signals which appear at the output 23.

The device 10 could less advantageously comprise two identical delay devices connected in series, the output of the first one being equivalent to the output 23 and the output of the second to the output 22.

Contrary to what would appear to be the case at first sight, the demodulating device in accordance with the invention does not involve any loss of the vertical definition of the information $\Phi$, and, on the contrary, improves it.

In the following, $\Phi_n$ will be used to designate the transmitted value of $\Phi$ relative to a point situated on any given vertical on the picture, and on the $n^{th}$ scanning line.

$\theta_n$ will be used to designate the value of $\Phi$ used in the receiver to reproduce this same point of the picture. Any phase errors due to imperfections of the equipment will be neglected here.

With a phase law of the PAL type, i.e. alternatively $$P'(t)=wT+\varphi(+)$$
$$P''(t)=wT-\varphi(t)$$

there is obtained, at the receiver and with a demodulating circuit which uses only S ($t$) and S ($t$–T), $$\phi_n=(\varphi_n+\varphi_{n-1})(\tfrac{1}{2})$$

while with the demodulating circuit of FIGS. 1 and 2 in accordance with the invention $$\phi_n=\left(\frac{\varphi n+\varphi n-2}{2}+\varphi_{n-1}\right)(\tfrac{1}{2})$$

With the phase law $$P'(t)=wt+\varphi(t)$$
$$P''(t)=wt$$

there is obtained, with a demodulating circuit using only S ($t$) and S ($t-$ T), and for the scanning line for which the transmitted subcarrier has the phase P' ($t$), e.g. for even lines $$\phi_{2K}=\varphi_{2K}$$

and, for odd lines $$\phi_{2K}+1=\varphi_{2K}$$

With a demodulating circuit of the type illustrated in FIGS. 1 or 2, there is obtained $$\phi_{2K}=(\varphi_{2K}+\varphi_{2K-2})\ (\tfrac{1}{2})$$
$$\phi_{2K+1}=\varphi_{2K}$$

Thus, there is no loss in vertical definition. However, it will be immediately apparent (although this is by no means essential) that the device in accordance with the invention will be improved if at the receiver the signal $\theta_n$ obtained hereinbefore for the $n^{th}$ line is assigned to the $(n-1)^{th}$ line. This can be quite simply achieved in practice by delaying, by the time T, the luminance signal with which the subcarrier is associated.

Putting it in a different way, since the subcarrier S ($t$) is, at the time $t$, modulated in accordance with video frequency signals themselves obtained from primary color signals derived from the scanning of the picture at this time $t$, those primary color signals being also used for generating the luminance sing signal Y ($t$), the latter is delayed by the time T so that Y ($t-$ T) is used to reproduce the image at the same time that S ($t$) is received.

This delay may be introduced at the transmitting side, which can be easily effected by means of a delay device included between the circuits delivering signal Y and the device forming the composite video signal.

It should be pointed out here that such a delay does not require so high a precision as that used for the subcarrier for which the phase must be preserved.

Using an arrangement of this kind, the following results are obtained: For the PAL system we get $$\phi_{n-1}=\varphi_{n-1}+\frac{\varphi_n+\varphi_{n-2}}{2}$$

and with the second phase law $$\phi_{2K-1}=\frac{\varphi_{2K}+\varphi_{2K-2}}{2},\ \phi_{2K}=\varphi_{2K}$$

these results being clearly superior as far as definition is concerned, to those which can be obtained when using S ($t$) and S ($t$–T) exclusively.

The luminance signal can also be delayed in the receiver.

It will be seen that the receiver will not need an additional delay device, if a delay device, having the required bandwidth for the transmission of the luminance signal, is provided for imparting the T delay (this device can either be simple or combined with the second delay device).

If the delay device is a simple one, it will be sufficient to delay the entire composite video signal by T and then to provide a filtering to obtain Y ($t$–T) and S ($t$–T).

If the delay device is a combined one, the composite video signal will be delayed both by T and by 2T, these delayed signals will then be filtered. The number of filters can obviously be reduced if the half sum of the undelayed composite video signal and of the signal delayed by 2T is produced, the filtering being effected on the resulting signal.

I claim:

1. In a color TV receiver for the PAL system, in which color information is transmitted on a subcarrier in the form of two sequential signals D sin $(wt+\theta)$ and D sin $(wt-\theta)$, alternating with each other at the line frequency, D and $\theta$ representing, respectively, the saturation and hue of a color dot transmitted at a time $t$, and where $w=2\pi$ times the frequency of the subcarrier, said receiver being of the type wherein said color information is recovered by deriving signals representative of D cos $\theta$ and D sin $\theta$ from the sum and difference of two terms, one of which is the modulated subcarrier delayed in a delay line by a period substantially equal to the duration T of a line, a method of eliminating phase errors in the recovered color signals which are caused by temperature variations in the delay line, which comprises the steps of:
   1. delaying said subcarrier in a delay line for a period substantially twice as long as the duration T of a line; and
   2. mixing said delayed subcarrier (i.e. 2T) with the non-delayed subcarrier to obtain the other term for said sum and difference of two terms.

2. In a color TV receiver for the PAL system in which the color information is transmitted on a subcarrier in the form of two sequential signals D sin $(wt+\theta)$ and D sin $(wt-\theta)$, alternating with each other at the line frequency, where D and $\theta$ represent, respectively, the saturation and hue of a color dot transmitted at a time $t$, and where $w=2\pi$ times the frequency of the subcarrier, a color subcarrier demodulating circuit for recovering said color information by deriving signals representative of D sin $\theta$ and D cos $\theta$ from the sum and difference of two terms, said demodulating circuit comprising:
   1. means for delaying the modulated subcarrier in a delay line by a period substantially equal to the duration T of a line to derive the first term for said sum and difference of two terms; and, to render the operation of demodulating 3. means for mixing the nondelayed subcarrier with the subcarrier delayed by the period substantially 2T, to derive the second term for said sum and difference of two terms.

circuit free from phrase errors caused by temperature variations in said delay line;

2. means for delaying said subcarrier in a delay line for a period substantially twice as long as the duration T of a line; and